United States Patent [19]

Stephan

[11] Patent Number: 5,092,793
[45] Date of Patent: Mar. 3, 1992

[54] SWIVEL APPARATUS PROVIDING STRAIN RELIEF FOR AN ELECTRICAL CONDUCTOR

[76] Inventor: John Stephan, 5780 Glasgow, Troy, Mich. 48098

[21] Appl. No.: 512,891

[22] Filed: Apr. 23, 1990

[51] Int. Cl.⁵ .............................................. H01R 13/56
[52] U.S. Cl. ..................... 439/446; 174/46; 235/472
[58] Field of Search ............... 439/445, 446, 13; 174/46, 86; 285/168; 235/472

[56] References Cited

U.S. PATENT DOCUMENTS

| | | | |
|---|---|---|---|
| 1,347,660 | 7/1920 | Reibard | 285/168 |
| 2,119,987 | 6/1938 | Follet | 285/1 |
| 2,242,303 | 5/1941 | Irmischer | 285/97.7 |
| 2,412,394 | 12/1946 | Giles | 285/168 |
| 2,530,540 | 11/1950 | Reichold et al. | 174/46 |
| 3,091,484 | 5/1963 | Laupot | 285/164 |
| 3,104,897 | 9/1963 | Berger | 285/166 |
| 3,144,263 | 8/1964 | Gray, Jr. | 285/269 |
| 3,604,923 | 9/1971 | Moffatt | 240/52 R |
| 3,735,142 | 5/1973 | Harr et al. | 250/219 D |

Primary Examiner—Gary F. Paumen
Attorney, Agent, or Firm—Basile and Hanlon

[57] ABSTRACT

A swivel apparatus couples an electrical conductor connected to an electrical device, such as a hand held, bar code scanner. The swivel apparatus includes a housing with a first end portion fixedly connectable to an electrical device and a freely movable second end portion. The second end portion rotates about the first end portion to convert bending forces exerted on the electrical conductor supported by the second end portion into movement of the second end portion with respect to the first end portion and twisting of the electrical conductor in a direction to relieve such bending forces on the electrical conductor. In one embodiment, the housing includes a base fixedly attached to the bar code scanner. The base includes an outwardly extending annular flange spaced from the main body of the base by a recess. A two-part clamp having first and second end portions is rotatingly mounted on the base. The first end portion of the two part clamp is rotatingly mounted about the annular flange and the recess on the base. The second end of the clamp is disposed at a predetermined angle with respect to the first end portion. The combination of the angle between the first and second end portions of the clamp and the rotatable mounting of the clamp with respect to the base causes the swivel apparatus to rotate in the direction of forces exerted on an electrical conductor extending through the swivel connector into the electrical device to minimize bending of the electrical conductor.

15 Claims, 4 Drawing Sheets

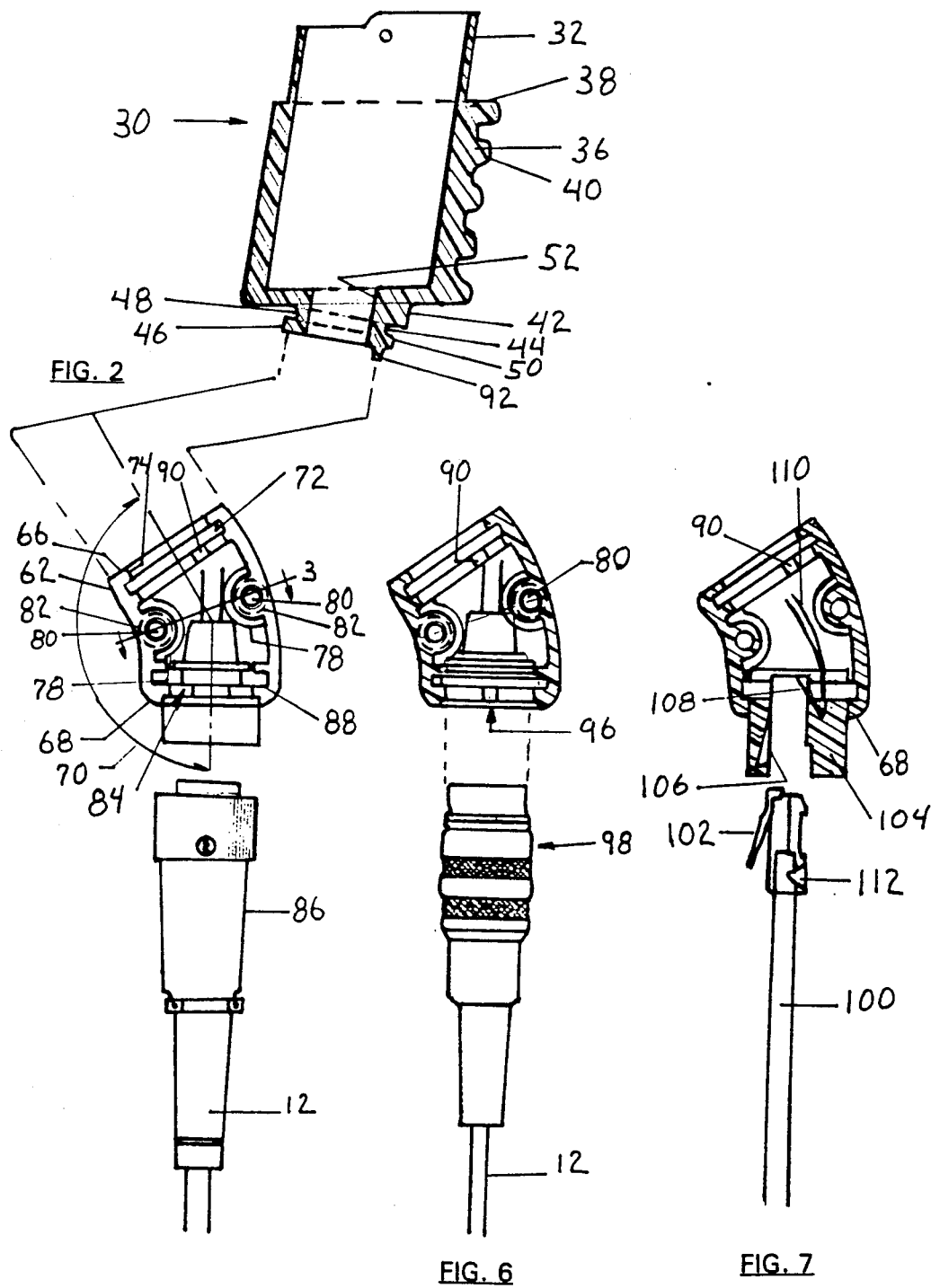

SWIVEL APPARATUS PROVIDING STRAIN RELIEF FOR AN ELECTRICAL CONDUCTOR

BACKGROUND OF THE INVENTION

1. Field of the Invention

The present invention relates, in general, to fittings and connectors for attaching electrical conductors to electrical devices and, specifically, to fittings and connectors for attaching electrical conductors to hand held bar code scanners.

2. State of the Art

In multi-conductor cords, small wires within the sheath or cord are subject to breakage after continual bending at a sharp radius which usually occurs at the connection of the cord to an electrical device. Hand held electrical devices, such as drills, and home appliances, such as hair dryers, etc., require extensive cord maintenance since such devices are manipulated through various angles and orientations during their use which puts considerable stress on the point of connection between the electrical conductor and the device.

In the electronics industry, portable hand held, moving beam, bar code scanners are used to read the bar code label on packages, objects, etc. Such scanners are extensively manipulated by a user in order to properly position the read head of the scanner to perform its optical function of reading the bar code label. Since the electrical conductor is stationarily attached at one end to a terminal, computer, etc., any bending movement of the scanner results in a bend at the point of connection of the electrical conductor or cord to the scanner.

With the advent of surface mount technology, the microchips employed in bar code scanners have reached a functional density to permit internal processing of the data (versus an external data decoder processing) within the scanner itself. Furthermore, such technology enables the scanner to directly transmit such data to a host computer. The electrical cords employed with such hand held scanners may have a range of internal conductors between three and twenty separate wires, depending upon the host interface requirements. As the cable has a fixed exterior physical diameter for its connection to the scanner, utilizing higher numbers of wires within the cable or cord requires a smaller gauge or wire size of the internal wires. These small gauge wires have a higher tendency to break after repeated bending coupled with a stretching action which is typically employed with hand held bar code scanners.

Such breakage renders the bar code scanner inoperable and thus requires immediate cable repair or replacement of the entire scanner and cable. Due to the high cost of such bar code scanners, having many spare scanners for replacement becomes quite costly. Furthermore, intermittent electrical signals due to cable degradation or wear causes many problems in a commercial environment where accurate data is critical to high productivity. Such gradual degradation also makes it difficult to identify data loss being due solely to cable malfunction.

In the general electrical arts, various connectors have been devised to attach an electrical conductor to an electrical device. Such connectors permit movement of the device and the electrical conductor with respect to each other, typically to provide repositioning of the electrical device. Such connectors employ ball and socket connections and other rotatable fittings to permit such rotation between the connector, the electrical conductor passing therethrough, and the electrical device. However, such connectors have a limited degree of rotation for fixed applications, such as lamps, and have not been applied to hand held, portable electrical devices for strain relief purposes. Nor have such rotatable or swivel connectors been employed with hand held, bar code scanners. Further, such previously devised rotatable connectors for electrical devices have fixed connections, such as threaded fasteners, at opposed ends for interconnection with the electrical device or a rigid tube surrounding the conductor which forms a part of the device, such as a lamp stand. In such connectors, the degree of rotation of the connectors merely provide for stationary repositioning of the electrical device with respect to the other components of the device, such as the rigid conductor tube.

Strain reliefs have been provided for electrical conductors at the point of connection of the conductors to an electrical device, such as hand held appliances, power tools, etc. Such strain reliefs comprise a somewhat rigid sheath which prevents the formation of sharp bends in the conductor which could lead to breakage of the conductor at the point of connection to the electrical device. However, such strain reliefs are still capable of bending to a limited degree which, over time and a large number of bends, lead to degradation and breakage of the electrical conductor at the point of connection to the electrical device.

Thus, it would be desirable to provide a swivel apparatus for an electrical device, such as a hand held, bar code scanner, which minimizes degradation or wear on the electrical conductor attached to the scanner caused by bending of the conductor. It would also be desirable to provide a swivel apparatus for a hand held, bar code scanner which is simple in construction and has a low manufacturing cost. It would also be desirable to provide a swivel apparatus for a hand held, bar code scanner which may be adapted for use with many different styles of bar code scanners. Finally, it would be desirable to provide a swivel apparatus which provides strain relief for an electrical conductor attached to an electrical device to minimize sharp bends at the point of connection of the electrical conductor to the electrical device by converting such bending forces to twisting movement of the swivel apparatus and electrical conductor.

SUMMARY OF THE INVENTION

The present invention is a swivel apparatus for supporting an electrical conductor connected to an electrical device, such as a hand held, bar code scanner. The swivel apparatus comprises a housing having a first end portion fixedly connectable to an electrical device and a freely movable second end portion. A through bore extends through the housing from the first to the second end portions for receiving an electrical conductor therethrough. Means are formed on the housing for converting bending forces externally applied to the electrical conductor at the point of connection between the electrical conductor and the second end portion of the housing and the electrical conductor into twisting movement of the second end portion of the housing with respect to the first end portion of the housing in a direction to relieve such bending forces on the electrical conductor. In a preferred embodiment, the converting means comprises means for rotatably mounting the second end portion of the housing to the first end portion. The second end portion is disposed at a predetermined angle with respect to the first end portion.

The swivel apparatus preferably includes a hollow base fixedly attachable to the handle of a bar code scanner. The base includes a first annular collar having a first diameter and an annular flange joined to the collar and having a second, larger diameter. The periphery of the annular flange extends radially outward from the periphery of the annular collar to form a recess between the annular collar and the base.

A hollow clamp is rotatably mounted about the annular flange. Stop means are formed in the base and the clamp for stopping complete 360° rotation of the clamp about the annular flange on the base.

The clamp has first and second end portions. The first end portion is rotatably mounted about the annular flange on the face. The second end portion of the clamp is disposed at a predetermined angle of greater than 90° and less than 180° between the central longitudinal axes of the first and second end portions of the clamp such that the clamp and the electrical conductor extending therethrough are free to rotate about the base in the direction of forces exerted on the conductor to prevent any substantial, sharp radius bending of the electrical conductor at the point of connection between the electrical conductor and the second end portion of the clamp.

In a preferred embodiment, the clamp comprises first and second, mirror image clamp halves. Fastener means are provided for releasably securing the first and second clamp halves together.

The second end portion of the clamp may be designed to receive a variety of conductor ends. In one embodiment, a standard strain relief mounted to an intermediate portion of the electrical conductor is fixedly secured in the second end portion of the clamp, with the electrical conductor extending through the clamp and body into the electrical device to which the swivel apparatus of the present invention is attached. In another embodiment, a quick disconnect connector is mounted in the second end portion of the clamp and matingly receives a quick disconnect, plug in connector attached to one end of the electrical conductor. The swivel apparatus in this embodiment still exhibits the desired rotation upon bending forces applied to the conductor at the point of connection of the conductor to the swivel apparatus.

In another embodiment, the swivel apparatus is configured for use in connecting a plug in, telephone-type jack to a telephone receiver. The second end portion of the clamp, in this embodiment, is configured to releasably receive the conventional plug-in jack attached to a telephone conductor. A contact mounted in the second end portion of the clamp is connected to electrical conductors attached to the telephone receiver.

The swivel apparatus of the present invention is particularly suited for use with bar code scanners and other hand held electrical devices and minimizes sharp radius bending of the electrical conductor attached to such devices at the point of connection of the conductor to the connector by converting a damaging bending motion normally exerted on the conductors to an internal, non-damaging twisting motion. The swivel apparatus is simple in construction and permits the electrical conductor to freely move in the direction of forces exerted on the conductor so as to minimize any sharp radius bending of the conductor at the point of connection to the swivel apparatus. This minimizes potential breakage of the small gauge wires in the conductor thereby extending the useful life of the electrical device while minimizing down time, repair and spare part storage costs.

BRIEF DESCRIPTION OF THE DRAWING

The various features, advantages and other uses of the present invention will become more apparent by referring to the following detailed description and drawing in which:

FIG. 2 is a cross sectional view through the swivel apparatus shown in FIG. 1;

FIG. 6 is a cross sectional view showing another embodiment of the swivel apparatus of the present invention; and FIG. 7 is a cross sectional view of yet another embodiment of the swivel apparatus of the present invention.

DESCRIPTION OF THE PREFERRED EMBODIMENTS

Figure 1:
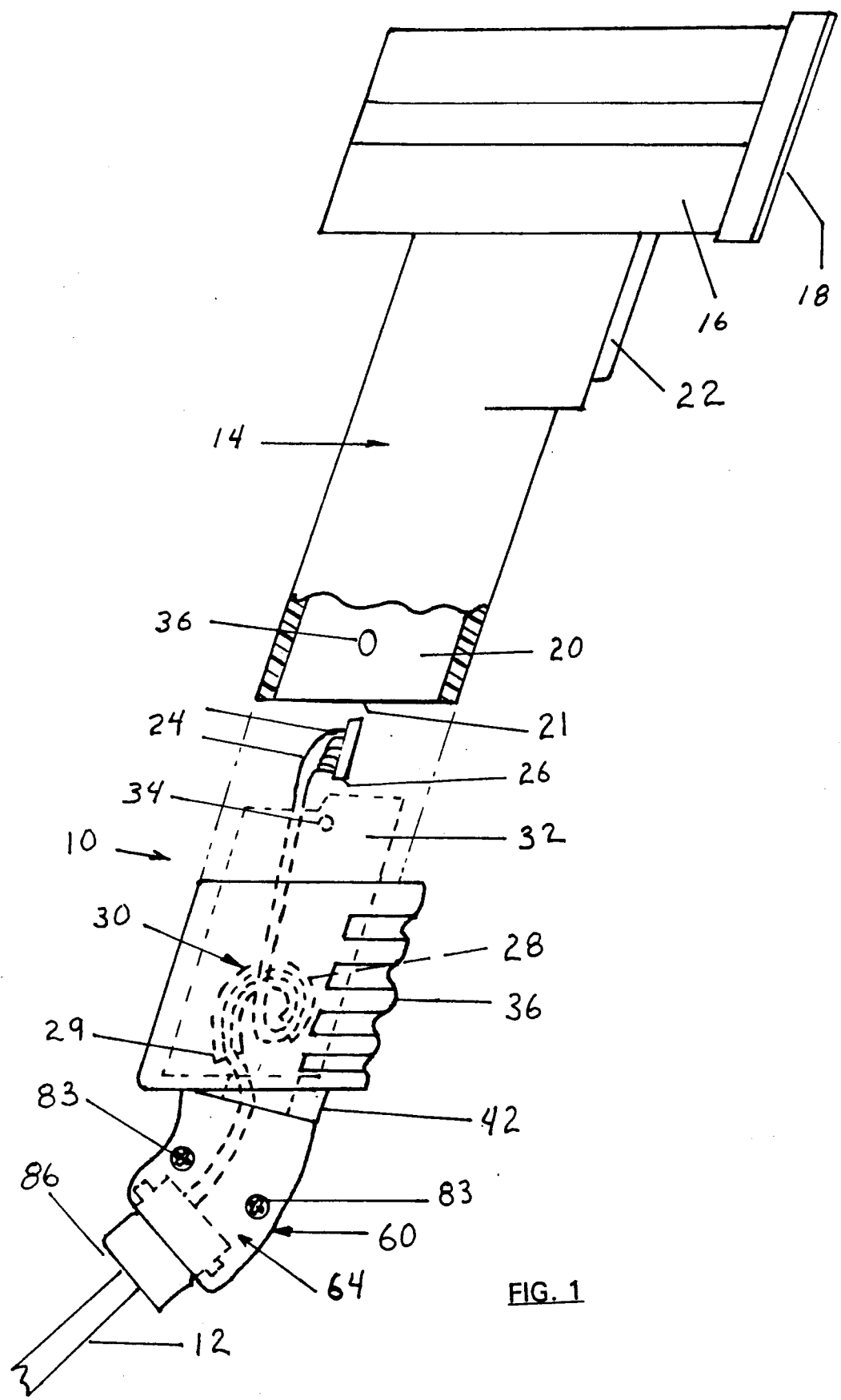
FIG. 1 is an exploded, side elevational view of a swivel apparatus of the present invention attached to a hand held bar code scanner constructed in accordance with the teachings of the present invention.

Throughout the following description and drawing, an identical reference number is used to refer to the same component shown in multiple figures of the drawing.

Referring now to the drawing and to FIG. 1 in particular, there is illustrated a swivel apparatus 10 suitable for mounting an electrical conductor 12 to a hand held electrical device 14 which prevents or minimizes sharp radius bending of the electrical conductor 12 at the point of connection or entry into the electrical device 14. The swivel apparatus 10 is particularly suited for mounting an electrical conductor 12 to a hand held, bar code scanner denoted by reference number 14.

Although the following description and drawing is particularly directed toward a hand held bar code scanner 14, it will be understood that the swivel apparatus 10 of the present invention may also be used with any portable, hand held electrical device, such as power tools, home appliances, etc., to connect electrical conductors to such electrical devices.

By way of background, the bar code scanner 14 is preferably a hand held, portable, moving beam bar code scanner, such as bar code scanners sold by Metrologic, Bellmawr, N.J., Series 90, hand held laser scanners. As is conventional, the bar code scanner 14 includes a read head 16 having an output end 18 through which a movable, fixed laser beam projects for reading the bar code label on packages, objects, etc. A handle 20 is integrally formed with the read head 16. A movable trigger 22 is mounted at one end of the handle 20 and, through a switch and suitable circuitry, activates the laser beam in the read head 16. An end cap, not shown, typically mounted at the end of the handle 20 is removed and discarded prior to attaching the swivel apparatus 10 to the handle 20 of the bar code scanner 14.

The electrical conductor 12 comprises one or more individual wires 24 wrapped in an insulating sheath.

The wires 24 terminate in a pin connector 26 which is attachable to a mating connector housed within the handle 20 of the bar code scanner 14. The opposite end of the conductor 12 is connected to a terminal, computer, etc., not shown. Further, as shown in FIG. 1, a loop 28 is formed in the conductor 12 for the purpose of providing strain relief for the conductor 12 during rotation of the swivel apparatus 10. The loop 28 is formed by employing a pliable shrink wrap tube 29 around a portion of the loop 28 in the electrical conductor 12. The shrink wrap tube 29 exhibits shape memory so as to return to its original loop form, as shown in FIG. 1, after being bent or twisted into other forms during movement of the swivel apparatus 10, as described hereafter. The loop 28 is press fit into contact with the side walls of the base of the swivel apparatus and provides internal stress relief for the wires 24 in the electrical conductor 12.

The swivel apparatus 10 preferably comprises a housing having a first end portion fixedly connectable to an electrical device, such as the bar code scanner 14 and a freely movable second end portion. A through bore extends through the housing from the first to the second end portion for supporting an electrical conductor therethrough. Means are formed on the housing for converting bending forces exerted on the electrical conductor 12 at the point of connection between the electrical conductor and the second end portion of the housing into movement of the second end portion of the housing with respect to the first end portion in a direction to relieve such bending forces on the electrical conductor. This minimizes the formation of sharp bending radii on the electrical conductor at the point of connection of the electrical conductor to the swivel apparatus 10 which will lead to degradation or breakage of the internal small gauge wires in the electrical conductor.

The converting means preferably comprises means for rotatably mounting the second end portion of the housing to the first end portion of the housing. The second end portion of the housing is disposed at a predetermined angle with respect to the first end portion. This combination causes the second end portion of the housing to move or rotate in multi-plane axes with respect to the first end portion which is fixedly connected to the hand held bar code scanner 14 in the direction of forces exerted on the electrical conductor so as to maintain the electrical conductor in a substantially straight line with respect to its opposite end which is attached to a terminal, computer, etc.

In a preferred embodiment, the housing of the swivel apparatus 10, shown in FIGS. 1 and 2, includes a base 30. The base 30 is in the form of a hollow, substantially tubular member. The base 30 is formed of a suitable lightweight material, such as a molded plastic.

The base 30 includes a first end 32 which is sized and shaped to slidably fit within the open end 21 of the hollow handle 20 of the bar code scanner 14. The shape and size of the first end 32 of the base 30 is selected to fit any handle configuration on any bar code scanner thereby enabling the swivel apparatus 10 of the present invention to be employed with many different styles and sizes of bar code scanners.

The first end portion 32 of the base 30 slides within the open end 21 of the handle 20 of the bar code scanner and is secured in place by means of a fastener which is mountable through an aligned aperture 34 in the first end 32 of the base 30 and an aperture 36 in the handle 20 of the scanner 14.

An enlarged handle grip 36 is formed on the base 30 and extends radially outward a short distance beyond the periphery of the first end 32 of the base 30. This forms a shoulder 38 between the hand grip 36 and the first end 32 which seats the base 30 in the handle 20 of the scanner 14. The hand grip 36 includes a plurality of spaced indentations 40 to provide easy handling of the swivel apparatus 10 and the bar code scanner 14.

Figure 3:
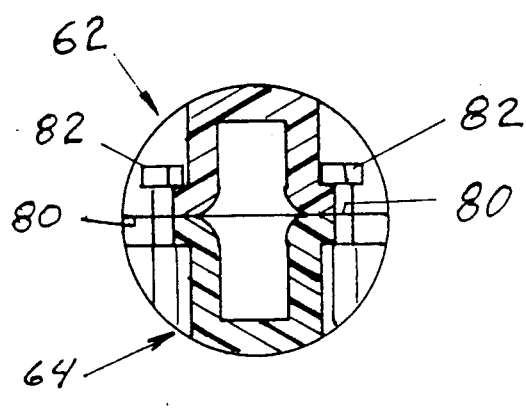
FIG. 3 is a cross sectional view generally taken along line 3—3 in FIG. 2.
Figure 4:
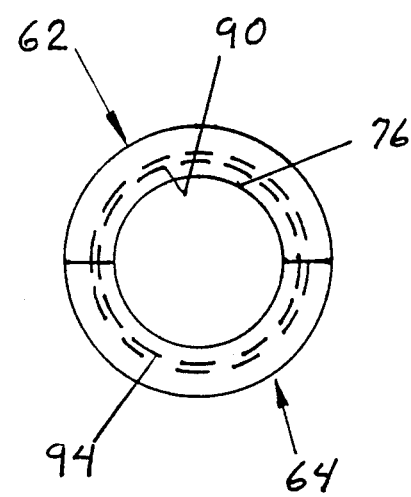
FIG. 4 is a plan view of the clamp shown in FIG. 2.

As shown more clearly in FIGS. 2, 3 and 4, the second end portion 42 of the base 30 includes a first annular collar 44 which is integrally formed with the base 30. The first collar 44 has a first diameter. An annular flange 46 is integrally formed adjacent to the first collar 44. The periphery of the annular flange 46 extends radially outward from the first collar 44 so as to overlay the side walls of the first collar 44 and form a recess 48 between one edge of the annular flange 46 and the second end 42 of the base 30. A second annular collar 50 is integrally formed adjacent to the annular flange 46. The second annular collar 50 has a shape substantially the same as the first annular collar 44. A bore 52 extends through the first annular collar 44, the annular flange 46 and the second annular collar 50 and is disposed in communication with the hollow interior of the base 30.

The swivel apparatus 10 also includes a clamp denoted in general by reference number 60 which is rotatingly mounted to the base 30. In a preferred embodiment, the clamp 60 comprises two mating, mirror image clamp halves 62 and 64. The clamp halves 62 and 64, when joined together, as described hereafter, form a through bore which extends through the joined clamp halves 62 and 64. Each of the clamp halves 62 and 64 is preferably formed of a molded plastic.

The first clamp half 62 includes a first end portion 66 and a second end portion 68. The first and second end portions 66 and 68 are disposed in a predetermined angular relationship, as shown by reference number 70 in FIG. 2. The angle between a central longitudinal axis through the first end portion 66 and a central longitudinal axis extending through the second end portion 68 is greater than 90° and less than 180°. Preferably, the angle 70 is approximately 135°.

An annular recess 72 is formed in the first end portion 66 of the clamp half 62 and is disposed between two substantially identical recesses 74 and 76. The recesses 74 and 76 correspond in size to the first and second annular collars 44 and 50 on the base 30. The annular recess 72 is sized to that of the annular flange 46 on the base 30 so as to rotatably mount the clamp half 62 to the base 30 in which the annular recess 72 is mounted about the annular flange 46.

A pair of spaced bosses 78 are formed on opposite sides of the clamp half 62 between the first and second ends 66 and 68 and include bores 80 for receiving a fastening means, such as a screw 83. A nut 82 is nonrotatingly mounted in the boss 80 for receiving the fastener 83, FIG. 1, which extends through the mating clamp half 64 to join the clamp halves 62 and 64 together.

The second end portion 68 of the clamp half 62 is formed with a series of recesses denoted in general by reference number 84 which fixingly receive a connector 86 shown in FIGS. 1 and 2. The connector 86 includes a nut at one end which fits within the enlarged recess 88 in the second end portion 68 of the clamp half 62 so as to fixingly mount the connector 86 to the clamp half 62.

The mating clamp half 64 is similarly formed with the same recess, bosses and bores as that described above for the first clamp half 62. Thus, the clamp half 64 is formed with recesses 72, 74 and 76 formed in the first end portion 66. Likewise, spaced bosses 78 having apertures 80 formed therein are formed in the second clamp half 64. A series of recesses 84 are formed in the second end 68 of the clamp half 64.

When the clamp halves 62 and 64 are secured together via the fasteners 83, the identical recesses in the first and second ends 66 and 68 form complete circular recesses about the two clamp halves 62 and 64. This forms a hollow bore extending completely through the joined clamp halves 62 and 64 for receiving and supporting the electrical conductor 12 therethrough.

Stop means, shown more clearly in FIGS. 2 and 4, are formed in at least one of the clamp halves 62 and 64 and on the base 30 for limiting rotation of the clamp 60 about the base 30 to angular movements of less than 360°. Preferably, the stop means is in the form of at least one lug 90 formed in the recess 76 in one of the clamp halves 62 or 64 which engages a corresponding lug 92 extending outward from the base 30. This limits rotation of the clamp 60 with respect to the base 30 to approximately 359°. The lug 92 extending downward from the base 30 slides within the recess 76 in the clamp 60 as the clamp 60 rotates about the fixedly mounted base 30.

Alternately, as shown in FIG. 4, a second lug 94 may be formed in the opposite clamp half 64 to provide a further limitation on the degree of rotation of the clamp 60 with respect to the base 30. With the two lugs 90 and 94, the lug 92 on the base 30 rotates in the recess 76 in the clamp 60 only between the two lugs 90 and 94.

In use, the conductor 12 is initially passed through the base 30 with the loop 28 formed in the conductor 12 disposed interiorly in a press fit within the base 30. The connector 26 at one end of the electrical conductor 12 is then attached to the corresponding mating connector in the handle 20 of the scanner 14. The base 30 is then inserted into and secured in position in the handle 20 of the scanner 14 as described above.

The mating clamp halves 62 and 64 are then disposed about the base 30 with the annular recesses 72 in the clamp halves 62 and 64, respectively, rotatably mounted about the annular flange 46 on the base 30. The fasteners 83 are then inserted through and attached to the nuts 82 in one of the clamp halves 62 and 64 to securely connect the clamp halves 62 and 64 together in a rotatable manner about the annular flange 46 on the base 30.

Figure 5:
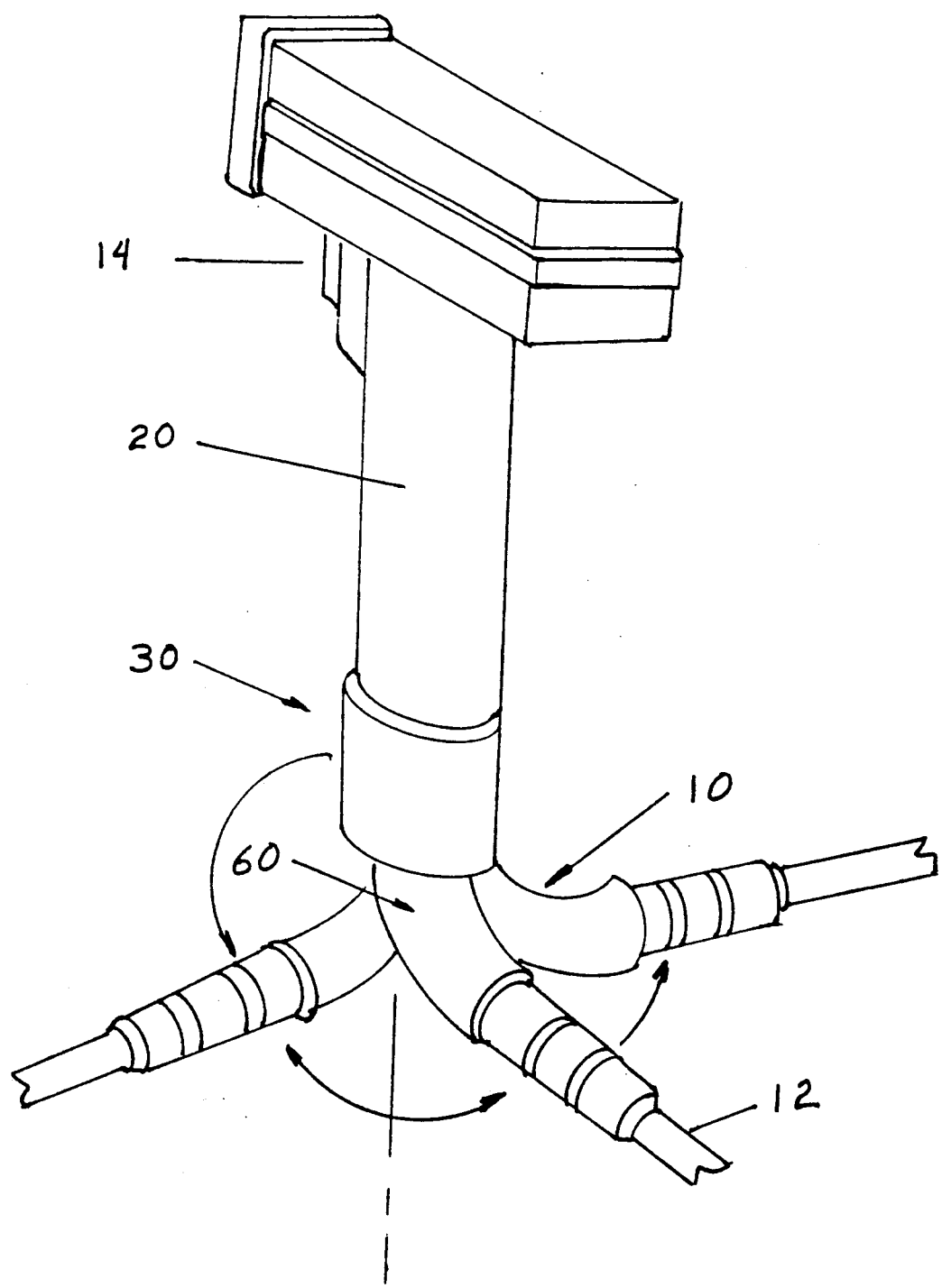
FIG. 5 is a perspective view showing the degrees of rotation of the swivel apparatus with respect to a bar code scanner.

Referring now to FIG. 5, the advantages of the swivel apparatus 10 of the present invention in minimizing sharp radius bends in the electrical conductor 12 with respect to the hand held scanner 14 will now be described.

The position of the clamp 60 of the swivel apparatus 10 shown in solid in FIG. 5 is assumed to be an initial position of the swivel apparatus 10. Forces exerted on the conductor 12 caused by manipulation and movement of the bar code scanner 14, including rotation, twisting or extension movements of the bar code scanner 14, will cause the swivel apparatus 10 to rotate about the annular flange 46 in the base 30 in the direction of the arrows in FIG. 5. This rotational movement may be either clockwise or counterclockwise, depending upon the direction of force applied to the conductor 12. The swivel apparatus 10 rotates in the direction of such forces to maintain the conductor 12 in a generally straight line with the clamp 60 of the swivel apparatus 10 which prevents sharp radius or arcs at the point of connection of the electrical conductor 12 to the swivel apparatus 10. This minimizes bending on the small gauge wires within the conductor 12. The stop means 90 and 92 housed within the swivel apparatus 10 limit rotation of the swivel apparatus 10 to angular movements of less than 360°.

In another embodiment shown in FIG. 6, a quick disconnect, multi-conductor connector 96 may be fixedly mounted in the second end 68 of the clamp 60. This connector 96 provides a releasable attachment for a mating connector 98 mounted on the end of the electrical conductor 12. However, the swivel apparatus 10 functions in the same manner as that described above to minimize bending of the conductor 12 at its connection to the quick disconnect connector housed in the swivel apparatus 10.

FIG. 7 depicts yet another embodiment of the swivel apparatus 10 of the present invention. In this embodiment, the clamp 60 is configured to releasably receive one end of a telephone cable 100 having a conventional insertable telephone jack 102 mounted at one end. The second end 68 of the clamp 60 includes a plastic sleeve 104 having a bore 106 formed therein. The bore 106 is configured to slidably receive the jack 102 attached to the end of the telephone cable 100. An electrical contact 108 is mounted in the sleeve 104 and is connected to wires 110 which extend through the clamp 60, the base 30 to connection with a conventional telephone receiver, not shown. In this manner, insertion of the telephone jack 102 into the sleeve 104 in the clamp 60 places the contacts 112 in the telephone jack 102 in electrical contact with the contact 108 in the sleeve 104 thereby providing connection between the telephone cable 100 and a telephone receiver. The swivel apparatus in this embodiment exhibits the same degree of rotation of movement as that described above to enable forces exerted on the telephone cable 100 caused by movement or bending of the telephone receiver with respect to the telephone cable 100 and minimize sharp bending of the telephone cable 100 at its point of connection to the swivel apparatus 10.

In summary, there has been disclosed a unique swivel apparatus suitable for use in attaching an electrical conductor to an electrical device, such as a hand held bar code scanner. The swivel apparatus is designed to rotate upon forces exerted on the conductor caused by movement of the electrical device so as to minimize sharp bending of the conductor at its point of connection to the swivel apparatus and the electrical device and to convert such bending to twisting of the electrical conductor. This prevents degradation and/or breakage of the small gauge wires in the conductor as encountered with previously devised hand held, bar code scanners and other electrical devices, and increases the useful life of such devices while minimizing maintenance, repair and spare part storage costs.

What is claimed is:

1. A combination of a swivel apparatus and an electrical conductor in which the electrical conductor is connected through the swivel apparatus to an electrical device, the combination comprising:
    a hollow base releasably and stationarily attachable at a first end portion thereof to an electrical device;
    the base including at a second end portion a first annular collar and an annular flange joined to the collar, the periphery of the annular flange extending radially outward from the periphery of the annular collar to form a recess between the periphery of the annular flange and the annular collar;

a hollow clamp rotatingly mounted about the annular flange and the recess on the base;

stop means formed on the base and the clamp for stopping complete 360° rotation of the clamp about the annular flange on the base;

the clamp having first and second end portions, the first end portion being rotatingly mounted about the annular flange on the base;

means for fixedly mounting an intermediate portion of an electrical conductor to the second end portion of the clamp, with the electrical conductor extending through the clamp and the base to an electrical connection with the electrical device; and a central longitudinal axis extending through the second end portion of the clamp being disposed at a predetermined angle with respect to a central longitudinal axis extending through the first end portion of the clamp such that bending forces exerted on the electrical conductor at the point of connection between the electrical conductor and the second end portion of the clamp are converted into movement of the clamp with respect to the base and twisting of the electrical conductor in a direction to relieve such bending forces on the electrical conductor.

2. The combination of claim 1 wherein the clamp comprises:
first and second, mirror image clamp halves; and
fastener means for releasably fastening the first and second clamp halves together.

3. The combination of claim 1 further including:
a first annular recess formed in the first end portion of the clamp, the first annular recess rotatingly engaging the annular flange on the base.

4. The combination of claim 1 further including:
a second annular recess formed in the second end portion of the clamp, the second annular recess fixedly receiving a strain relief fitting attached to the electrical conductor.

5. The combination of claim 1 wherein the angle between the central axes of the first and second end portions of the clamp is greater than 90° and less than 180°.

6. A combination of a bar code scanner having a handle, an electrical conductor connected to electrical components housed within the bar code scanner, and a swivel apparatus for supporting the electrical conductor, the combination comprising:
a hollow base fixedly attachable to the handle of the bar code scanner;
the base including a first annular collar and an annular flange joined to the collar, the periphery of the annular flange extending radially outward from the periphery of the annular collar to form a recess between the periphery of the annular flange and the annular collar;
a hollow clamp rotatingly mounted about the annular flange and the recess on the base;
stop means formed on the base and the clamp for stopping complete 360° rotation of the clamp about the annular flange on the base;
the clamp having first and second end portions, the first end portion being rotatingly mounted about the annular flange on the base;
means for fixedly mounting an intermediate portion of an electrical conductor to the second end portion of the clamp, with the electrical conductor extending through the clamp and the base to an electrical connection with the bar code scanner; and
a central longitudinal axis extending through the second end portion of the clamp being disposed at a predetermined angle with respect to a central longitudinal axis extending through the first end portion of the clamp such that the clamp and the electrical conductor rotate about the base in the direction of a force exerted on the electrical conductor to convert bending of the electrical conductor at the point of connection between the electrical conductor and the second end portion of the clamp into rotation of the clamp and twisting of the electrical conductor to reduce such bending of the electrical conductor.

7. The combination of claim 6 wherein the clamp comprises:
first and second, mirror image clamp halves; and
fastener means for releasably fastening the first and second clamp halves together.

8. The combination of claim 6 further including:
a first annular recess formed in the first end portion of the clamp, the first annular recess rotatingly engaging the annular flange on the base.

9. The combination of claim 6 further including:
a second annular recess formed in the second end portion of the clamp, the second annular recess fixedly receiving a strain relief fitting attached to the electrical conductor.

10. The combination of claim 6 wherein the angle between the central axes of the first and second end portions of the clamp is greater than 90° and less than 180°.

11. A swivel apparatus for supporting an electrical conductor connected to an electrical device, the swivel apparatus comprising:
a hollow base fixedly attachable to the electrical device;
the base including a first annular collar and an annular flange joined to the collar, the periphery of the annular flange extending radially outward from the periphery of the annular collar to form a recess between the periphery of the annular flange and the annular collar;
a hollow clamp rotatingly mounted about the annular flange and the recess on the base;
stop means formed on the base and the clamp for stopping complete 360° rotation of the clamp about the annular flange on the base;
the clamp having first and second end portions, the first end portion being rotatingly mounted about the annular flange on the base;
means for fixedly mounting an intermediate portion of an electrical conductor to the second end portion of the clamp, with the electrical conductor extending through the clamp and the base to an electrical connection to the electrical device; and
a central longitudinal axis extending through the second end portion of the clamp being disposed at a predetermined angle with respect to a central longitudinal axis extending through the first end portion of the clamp such that the clamp and the electrical conductor rotate about the base in the direction of a force exerted on the electrical conductor to reduce sharp bending of the electrical conductor at the point of connection between the electrical conductor and the second end portion of the clamp.

12. The swivel apparatus of claim 11 wherein the clamp comprises:

first and second, mirror image clamp halves; and fastener means for releasably fastening the first and second clamp halves together.

13. The swivel apparatus of claim 11 further including:

a first annular recess formed in the first end portion of the clamp, the first annular recess rotatingly engaging the annular flange on the base.

14. The swivel apparatus of claim 11 further including:

a second annular recess formed in the second end portion of the clamp, the second annular recess fixedly receiving a strain relief fitting attached to the electrical conductor.

15. The swivel apparatus of claim 11 wherein the angle between the central axes of the first and second end portions of the clamp is greater than 90° and less than 180°.

* * * * *